United States Patent [19]
Rogier

[11] 3,717,598
[45] Feb. 20, 1973

[54] POLYAMIDE COMPOSITIONS

[75] Inventor: Edgar R. Rogier, Minnetonka, Minn.

[73] Assignee: General Mills, Inc.

[22] Filed: Dec. 5, 1968

[21] Appl. No.: 781,587

Related U.S. Application Data

[63] Continuation-in-part of Ser. No. 551,925, May 23, 1966, abandoned.

[52] U.S. Cl.............260/18 N, 161/197, 260/404.5
[51] Int. Cl............................C03c 27/06, C09j 3/00
[58] Field of Search...........260/18 N, 404.5; 161/197

[56] References Cited

UNITED STATES PATENTS

| | | |
|---|---|---|
| 3,447,999 | 6/1969 | Rogier et al...........................161/197 |
| 2,512,606 | 6/1950 | Bolton et al............................260/78 |
| 2,516,585 | 7/1950 | Pease ......................................260/78 |
| 3,239,545 | 3/1966 | Rogier................................260/404.5 |

FOREIGN PATENTS OR APPLICATIONS

| | | |
|---|---|---|
| 1,000,216 | 4/1965 | Great Britain..........................260/18 |

OTHER PUBLICATIONS

Floyd, Polyamide Resins, page 12 (1958), Call No. TP 978.F53.

Primary Examiner—Donald E. Czaja
Assistant Examiner—Eugene C. Rzucidlo
Attorney—Anthony A. Juettner, William C. Babcock and Patrick J. Span

[57] ABSTRACT

There is disclosed polyamide compositions of fractionated polymeric fat acids and diamines of the formula

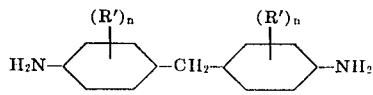

where R' is an alkyl group having from 1–4 carbon atoms and n is an integer designating the number of substituent groups present. When $n$ is 0, the ring is accordingly an unsubstituted cyclohexyl ring. Illustrative diamines are 4,4'-diaminodicyclohexylmethane and 4,4'-diamino-3,3'-dimethyldicyclohexylmethane. Copolymerizing dibasic acids such as suberic, sebacic or dodecanedioic acids may also be present. The polyamides find utility as molding powders, adhesives and in the form of films or sheets.

1 Claim, No Drawings

POLYAMIDE COMPOSITIONS

This application is a continuation-in-part application of my copending application Ser. No. 551,925 filed May 23, 1966, now abandoned.

This invention relates to polyamide compositions and in particular to polyamides or polycarbonamides of fractionated polymeric fat acids and a diamine of the formula

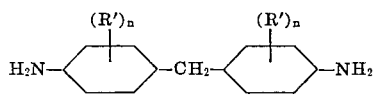

wherein R' is an inert substituent such as an alkyl group having from one to four carbon atoms and $n$ is an integer designating the number of substituent groups present. Where $n$ is zero, the ring is accordingly an unsubstituted, cyclohexyl ring. Further, the invention relates to copolymer polyamide compositions in which certain other dibasic acids or esters are employed in addition to the polymeric fat acid compounds and the diamines defined above.

The polyamides of the present invention are characterized by having a highly desirable combination of properties. Thus the products have an inherent viscosity greater than 0.4, a tensile strength and yield stress greater than 4000 psi., a tensile modulus greater than 90,000 psi, and in most instances greater than 100,000 psi, a high elongation, i.e., greater than 75 percent, in addition to having good heat stability (without addition of any stabilizers) and good resistance to dilute sulfuric acid. In addition thereto, the copolymers using other dibasic acids are clear and transparent.

Briefly, the polyamide compositions of the present invention are prepared by reacting the above-defined diamines with fractionated polymeric fat acids or mixtures thereof with other dibasic acids or esters under conventional amide-forming conditions, i.e., heating at elevated temperatures for a time sufficient to effect amidification. The specific time and temperature of reaction are not critical and may be varied over a considerable range. Preferably a temperature of about 100°–300° C. for a period of about ½–8 hours is employed, the longer period being employed at the lower temperatures. Essentially, one molar equivalent of amine is employed per molar equivalent of carboxyl group present.

The polymeric fat acids employed in this invention are fractionated polymeric fat acids having an excess of about 90 percent weight, and preferably in excess of about 95 percent, of the dimeric species. The term "polymeric fat acids" as used herein is intended to be generic to polymerized acids obtained from "fat acids". The term "fat acids" is intended to include saturated, ethylenically unsaturated and acetylenically unsaturated, naturally occurring and synthetic, monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecanoic acid, linderic acid, lauroleic acid, myristoleic acid, tsuzuic acid, palmitoleic acid, gadoleic acid, cetoleic acid, nervonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids. Mixtures of these acids are found commercially in tall oil fatty acids and, accordingly, tall oil fatty acids are the common source for the polymeric fat acids.

It is understood that such other derivatives of polymeric fat acids, capable of forming amides in a reaction with a diamine, such as the lower alcohol (alkyl having one to eight carbon atoms) esters of polymeric fat acids may be employed.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst. Where color and stability of the polymers are particularly important, hydrogenated and fractionated polymeric fat acids are the preferred starting materials.

Typical compositions of commercially available polymeric fat acids, based on unsaturated $C_{18}$ fat acids (tall oil fatty acids), are:

$C_{18}$ monobasic acids ("monomer") 5–15 percent by weight;

$C_{36}$ dibasic acids ("dimer") 60–80 percent by weight;

$C_{54}$ (and higher) polybasic acids ("trimer") 10–35 percent by weight.

The relative ratios of monomer, dimer and trimer (or higher) in unfractionated polymeric fat acids are dependent on the nature of the starting material and the conditions of polymerization. For the purposes of this invention, the term monomeric fat acids refers to the unpolymerized monomeric acids or derivatives present in the polymeric fat acids; the term dimeric fat acids refers to the dimeric acids of derivatives (formed by the dimerization of two fat acid molecules); and the term trimeric fat acids refers to the residual higher polymeric forms consisting primarily of trimeric acids or derivatives, but containing some higher polymeric forms.

As a practical matter, the monomeric, dimeric and trimeric fat acids, may be determined by a micromolecular distillation analytical method. The method is that of Paschke, R. E., et al., J. Am. Oil Chem. Soc. XXXI (No. 1) 5, (1954), wherein the distillation is carried out under high vacuum (below 5 microns) and the monomeric fraction is calculated from the weight of product distilling at 155°C., the dimeric fraction is calculated from that distilling between 155°C. and 250°C., and the trimeric (or higher) fraction is calculated based on the residue. Another method which may be employed to determine the amounts of monomeric, dimeric, and trimeric fat acids present is conventional gas-liquid chromatography (G.L.C.) of the corresponding methyl esters. In this method an intermediate fraction between the monomeric and dimeric is generally reported. Unfortunately, there is no simple relationship between the two methods of analysis. In general, however, the G.L.C. method will show lower amounts of dimeric fat acid content, i.e., 90 percent dimeric content by G.L.C. being substantially about 94–95 percent by the micromolecular distillation method. Unless otherwise indicated herein, the amounts of monomeric, dimeric, and trimeric fat acids were determined by this method.

Mixtures may be fractionated by suitable means such as high vacuum distillation or solvent extraction techniques so as to obtain dimer acid cuts of greater than about 90 percent dimeric species by weight as determined by gas-liquid chromatography. It is these dimer-rich fractions which are the starting materials for the polyamides of the present invention.

As indicated above, the diamines employed in the present invention for reaction with the fractionated polymeric fat acids are those having the formula

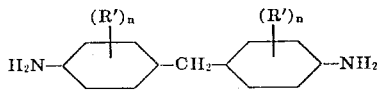

wherein R' is an inert substituent group such as an alkyl group having from one to four carbon atoms. It is also understood that while one substituent R' group per ring is preferred, each ring may contain more than one substituent, the number of substituents which may be designated by the integer $n$. When $n$ is 0, the rings are unsubstituted. As a practical matter, $n$ will usually not be greater than 4. Illustrative of such diamines are 4,4'-diaminodicyclohexylmethane, and 4,4'-diamino-3,3'-dimethyldicyclohexylmethane, which are preferred.

Accordingly, R' is preferably a methyl group and $n$ is preferably 0 or 1.

Co-reacting dibasic acids or esters employed in the preparation of the copolyamides of the present invention are selected from compounds having the formula

where R''' is a divalent alkylene radical having from six to 10 carbon atoms and R'' is hydrogen or an alkyl group having from one to four carbon atoms. Such acids are illustrated by suberic, azelaic, sebacic, and dodecanedioc acids.

Considerable variation is possible in the relative proportions of the reactants employed depending upon the particular set of properties desired in the resin. In general, the carboxyl groups attributable to the polymeric fat acids may account for at least about 25 equivalent percent of the total carboxyl groups present, the remainder being attributable to co-reacting dibasic acid present. For many applications of the resins of the instant invention, the preferable range of carboxyl groups attributable to the polymeric fat acids is about 35 equivalent percent of the total carboxyl groups present. As previously indicated, essentially one equivalent of amine is employed per equivalent of carboxyl present.

As indicated earlier, the copolymers with co-reacting dibasic acids are clear and transparent products. Product clarity and transparency, while generally not a problem in homopolymer products of polymeric fat acids, is a common problem with other copolymer products where a mixture of polymeric fat acids and other co-reacting dibasic acids are employed with other diamines. Unexpectedly, the use of the diamines employed herein with the mixtures of polymeric fat acids and co-reacting dibasic acids provides copolymers which are clear and transparent.

The mechanical properties of direct interest in the compositions of the present invention are tensile strength elongation and tensile secant modulus of elasticity. These properties are measured on an Instron Tensile Tester Model TTC using ASTM D 1708–59T.

The polymer is compression molded as a 6 × 6 inch sheet of approximately 0.04 inches thickness. From this sheet, test specimens are die-cut to conform to ASTM 1708–59T.

Tensile strength (reference: ASTM D–638–52T) is calculated as:

$$\text{Tensile strength at break} = \frac{\text{load in pounds at break}}{\text{cross sectional area (sq. in.)}}$$

Percent elongation is calculated as:

$$\text{Percent elongation} = \frac{\text{gage length at break minus gage length at 0 load} \times 100}{\text{gage length at 0 load}}$$

Tensile Secant Modulus of elasticity is defined in ASTM D–638–60T (at 2 percent Elongation).

In addition to tensile strength and elongation, the following properties were measured on most of the polymers prepared:

1. Ball and ring softening point — ASTM E28–59T.
2. Amine and acid end groups — conventional analytical titration procedures. The results are expressed in terms of milliequivalents of acid or amine per kilogram of product (meq./kg.).

3. Inherent viscosity — defined by equation: $\eta inh = (ln\eta rel/C)$ where $C$ = concentration of polymer in grams per 100 ml. of solvent, $ln\eta rel$ = natural logarithm of the relative viscosity of the dilute polymer solution. In the examples below all viscosities are measured on m-cresol at 30°C., usually at a concentration of 1.0 g./100 ml.

4. Yield Stress — ASTM D 638–61T.

The following examples will serve to further illustrate the invention in which all parts and percentages are by weight unless otherwise indicated.

EXAMPLE 1

Into a reactor equipped with a stirrer, thermocouple, and a distillation head was placed 283.0 g. (1.0 equivalents of a hydrogenated and distilled polymeric fat acid prepared from tall oil fat acids) having the following analysis:

* % Monomer (M)=0.7
* % Dimer (D)=99.1
* % Trimer (T)=0.2
  Saponification equivalent (S.E.)=285
  Neutralization equivalent (N.E.)=290

\* micro-molecular distillation and 121.2 g. (1.0 equivalents) of 4,4'-diamino-3,3'-dimethyldicyclohexylmethane.

The mixture was heated for 0.75 hour to 200°C., 0.25 hour at 200°–250°C., 1.25 hours at 250°C., and 3.25 hours under vacuum (ca.<1 mm Hg) at 250°C. The resulting polyamide had the properties as indicated in Table I.

EXAMPLE 2

Into the reactor described in Example 1 were placed 198.1 g. (0.7 equivalents) of hydrogenated distilled polymeric fat acid having the following analysis (G.L.C.)

% M=0.9
% I=1.8
% D=96.6
% T=0.7
S.E.=198
N.E.=193 and 73.01 g. (0.7 equivalents) of 4,4'-diaminodicyclohexylmethane.

The mixture was heated with agitation to 170°C. and then held at this temperature for 2.5 hours. The temperature was then raised over 1 hour to 250°C. and then under vacuum for 2 hours at 250°C. The resulting homopolymer had the properties described in Table I.

EXAMPLE 3

Into the reactor described in Example 1 were placed 283 g. of hydrogenated distilled polymeric fat acid described in Example 2, and 116.5 g. of 4,4'-diamino-3,3'-dimethyldicyclohexylmethane.

The mixture was heated with agitation for 0.75 hour to 200°C., 0.25 hour at 200°–250°C., 2 hours at 250°C., and under vacuum at 275°C. for 3.5 hours. The resulting homopolymer had the properties described in Table I.

EXAMPLE 4

Into a stainless steel reactor, equipped with a distillation head, thermometer and stirrer were placed 333.9 g. (1.18 equivalents) of the hydrogenated distilled polymeric fat acid described in Example 2, 76.8 g. (0.75 equivalents) of sebacic acid and 224.8 g. (1.93 equivalents) of 4,4'-diamino-3,3'-dimethyldicyclohexylmethane.

The mixture was heated with agitation to 160°C. over a period of 1.25 hours, to 250°C. over a period of 2.5 hours and then under vacuum at 250°–260°C. for 2 hours. The resulting copolymer had the properties described in Table I.

EXAMPLE 5

Into a stainless steel reactor equipped with a stirrer, thermocouple and a distillation head were placed 223 g. (0.788 equivalent), of the hydrogenated distilled polymeric fat acid of Example 2, 154.6 g. (1.510 equivalents), of sebacic acid and 267.7 g. (2.298 equivalents) of 4,4'-diamino-3,3'-dimethyldicyclohexylmethane.

The mixture was heated 1 hour to 170°C., 1.75 hours at 170°–250°C. and then 2.25 hours under vacuum (<0.1 mm Hg.) at 270°C. The resulting polyamide had the properties indicated in TABLE I.

EXAMPLE 6

Into the reactor described in Example 5 above were placed 334 g. (1.18 equivalents) of the hydrogenated distilled polymeric fat acid of Example 2, 76.2 g. (0.66 equivalents) of 1,12-dodecanedioc acid and 214.4 g. (1.84 equivalents) of 4,4'-diamino-3,3'-dimethyldicyclohexylmethane.

The mixture was heated 4.5 hours to 250°C., and then 2.25 hours under vacuum at 275°C. The resulting polyamide had the properties indicated in Table I.

EXAMPLE 7

Into the reactor described in Example 5 were placed 223 g. (0.788 equivalents) of the hydrogenated distilled polymeric fat acid of Example 2, 153.1 g. (1.320 equivalent) of 1,12-dodecanedioc acid and 244.6 g. (2.108 equivalents) of 4,4'-diamino-3,3'-dimethyldicyclohexylmethane.

The mixture was heated 4.25 hours to 250°C. and then 2 hours under vacuum (about 0.1 mm Hg) at 275°C. The resulting polyamide had the properties indicated in TABLE I.

EXAMPLE 8

Into the reactor described in Example 5 above were placed 344.4 g. (1.217 equivalents) of the hydrogenated distilled polymeric fat acid of Example 2, 81.05 g. (0.797 equivalents), of sebacic acid and 211.87 g. (2.014 equivalent) of 4,4'-diamino dicyclohexylmethane.

The mixture was heated 3.5 hours to 250°C. and then under 2.5 hours under vacuum at about 275°C. The resulting polyamide had properties as indicated in TABLE I.

TABLE I

| Properties of Polyamide | Example 1 | Example 2 | Example 3 | Example 4 |
|---|---|---|---|---|
| Amine (meq/kg) | 37.7 | 23.5 | 32.4 | 39.5 |
| Acid (meq/kg) | 48.7 | 45.1 | 45.0 | 69.6 |

| Properties of Polyamide | | | | |
|---|---|---|---|---|
| Inherent Viscosity | 0.45 | 0.56 | 0.59 | 0.57 |
| Ball and Ring Softening Point °C. | 169 | 168 | 187 | 176 |
| Tensile strength at break (psi) | 4,445 | 4,900 | 5,275 | 5,187 |
| Elongation % | 152 | 212 | 213 | 92 |
| Yield Stress (psi) | 4,870 | 4,120 | 4,197 | 5,926 |
| Tensile Secant Modulus (2% elongation) (psi) | 121,300 | 92,100 | 91,500 | 116,000 |

| Properties of Polyamide | Example 5 | Example 6 | Example 7 | Example 8 |
|---|---|---|---|---|
| Amine (meq/kg) | 15.5 | 23 | 18 | 19.5 |
| Acid (meq/kg) | 12.3 | 91.5 | 112 | 46.5 |
| Inherent Viscosity | 0.65 | 0.55 | 0.62 | 0.62 |
| Ball and Ring Softening Point °C. | 198 | 178 | 187 | 200 |
| Tensile strength at break (psi) | 6,310 | 5,180 | 5,510 | 4,190 |
| Elongation % | 135 | 140 | 80 | 175 |
| Yield Stress (psi) | 6,840 | 5,690 | 6,910 | 5,600 |
| Tensile Secant Modulus (2% elongation) (psi) | 133,800 | 111,000 | 133,000 | 124,000 |

The examples herein have been limited to the components of the polyamide itself. This is not meant to be limiting as to the scope of the invention and it is understood that the compositions may include stabilizers, anti-oxidants, pigments, fillers and the like.

The embodiments of the present invention in which an exclusive property of privilege is claimed are defined as follows:

1. A clear and transparent polyamide comprising the reaction product at temperatures of about 100°–300° C. of a mixture of a hydrogenated polymeric fat acid having a dimeric content greater than 90 percent by weight as determined by gas-liquid chromatography and a dicarboxylic acid selected from the group consisting of sebacic and 1,12-dodecanedioic acid with a diamine selected from the group consisting of 4,4'-diaminodicyclohexylmethane and 4,4'-diamino-3,3'-dimethyldicyclohexylmethane, the equivalents of amine employed being essentially equal to the equivalents of carboxyl groups employed and in which the equivalents of carboxyl groups of said hydrogenated polymeric fat acid account for at least about 25 percent of the total equivalents of carboxyl groups employed.

* * * * *